C. M. SPENCER.
Machines for Making Metal Screws.
No. 143,306. Patented September 30, 1873.
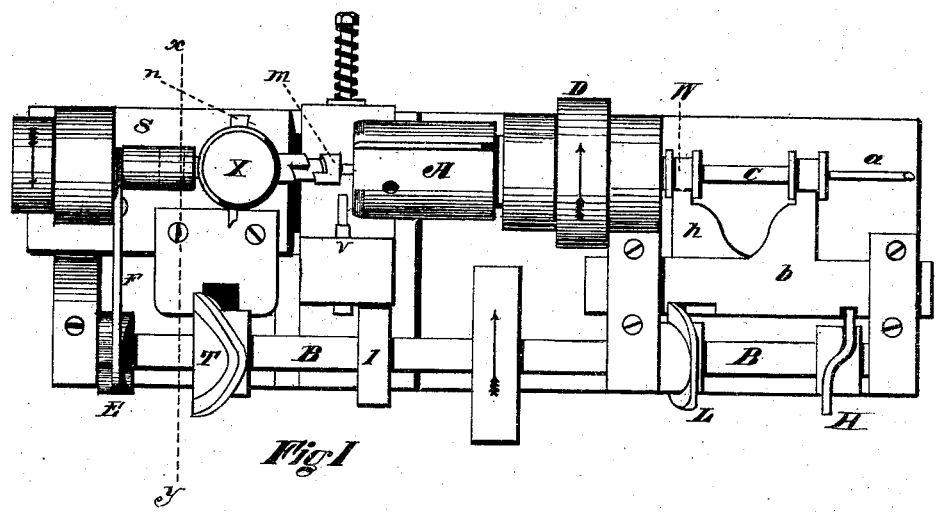
Fig. I
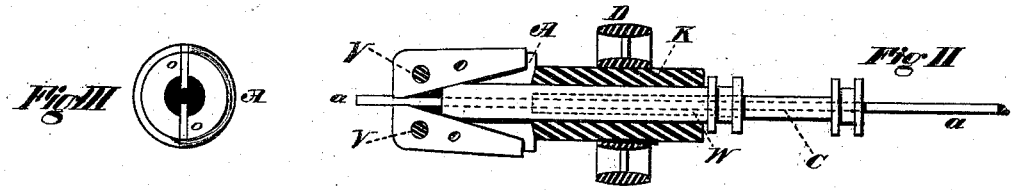
Fig. III  Fig. II
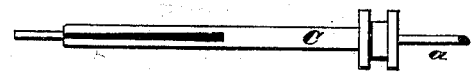
Fig. IV
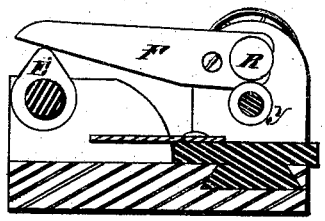
Fig. V
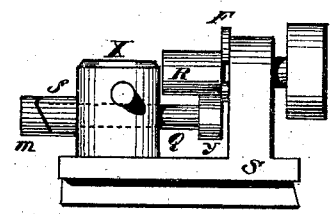
Fig. VI
Witnesses
Jas. L. Johnson
Chas. G. Whiting
Inventor
C. M. Spencer
by his attorneys
Gardiner & Hyde

UNITED STATES PATENT OFFICE.

CHRISTOPHER M. SPENCER, OF HARTFORD, CONNECTICUT.

IMPROVEMENT IN MACHINES FOR MAKING METAL SCREWS.

Specification forming part of Letters Patent No. 143,306, dated September 30, 1873; application filed March 6, 1873.

*To all whom it may concern:*

Be it known that I, CHRISTOPHER M. SPENCER, of Hartford, Hartford county, State of Connecticut, have invented an Improved Screw-Machine, of which the following is a specification:

My invention relates to the combination and arrangement of devices by which the chuck of a screw-machine which holds the work against the tools, shall have a uniformly continuous motion, provision being made therefor by causing, at the proper time, a greater speed than that possessed by the chuck, to be imparted to the screw-cutting die, to cause it to follow off of the thread cut by it upon the work; and to the construction of a feed mechanism that shall automatically and in an intermittent manner carry the stock and operate the chuck, and determine the length of the screw; the object of my invention being the construction of a machine in which the operations of sizing and shaping the blank, forming the screw, and cutting off the screw from the rod, shall be performed automatically, to the further advantage, also, of saving the time hitherto lost in stopping and reversing the motion of the chuck, to release the die from the thread formed upon the stock.

In the drawings, Figure I is a plan view; Fig. II, a partial sectional view of the chuck; Figs. III and IV, detail views; Fig. V, a section on line $x\ y$, Fig. I; and Fig. VI, a side view of the tool-carriage.

The revolution of the shaft B by means of the cam H and connection $b$, carries the stock $a$ until as much of it as corresponds with the length of the screw to be formed, is projected from the mouth of the revolving chuck A, when, by the continued revolution of shaft B, the sleeve W, by means of cam L and connection $h$, compels the chuck to hold the stock $a$, while, by means of cam T upon revolving shaft B, the forming-tools in the turret X are as many as is necessary to shape the blank for the screw, brought one at a time against the stock, and then the die $m$, for cutting the the thread thereon, after the blank has been prepared for it.

The turret X may have several forming-tools, the shape of the cam T determining the number of reciprocations the slide S holding the turret shall have toward the stock $a$, while the connection $h$, influencing the chuck holding the stock, shall have lost motion upon cam L. In the drawing, one forming-tool, $n$, is shown to be alternately advanced with the die $m$, while the stock $a$ is held. After the screw has been otherwise formed by the forming-tools and thread-cutting die, the heading and cutting-off tool V is moved by cam I to head and cut off the screw from the stock; after which the continued revolution of shaft B causes, by the withdrawal of sleeve W, the chuck-jaws to be relaxed when the general operation above described is recommenced.

The chuck A forms part of or is attached to the hollow spindle K, and receives its motion from the pulley D. The jaws $o\ o$ are hung at V V, and present inclined sides to the conical end of the reciprocating sleeve W, as shown in Fig. II, so as to be closed by the pressure of said sleeve. Having an independent reciprocating motion within sleeve W is the sleeve C, constructed as shown in Fig. IV, to grasp the stock $a$ with sufficient friction to carry the end of the stock past the relaxed jaws of the chuck while sliding upon the stock, when the same is held by the jaws until in the position to feed again. The carriage S, having the revolving turret X, is moved toward and from the chuck A by cam T, its reciprocating movement in its track revolving the turret by means of a pawl and ratchet, one of which is in the turret, and the other in the bed or track, as is common in screw-machines. The turret carries a spindle Q, upon one end of which is the die $m$, and upon the other a roller, $y$, as seen in Fig. IV. The die is held by the clutch $f$, attached to and forming part of the turret X, when brought against the end of the stock $a$, and its advancement, when so held or clutched, cuts the thread. When, however, the die is released by the withdrawal of the turret with its clutch, the friction-pulley R, by means of cam E upon shaft B, and lever F, is brought to give speed through roller $y$ to the spindle Q greater than possessed by the stock $a$ in the clutch H, and the die is run off of the thread it has cut without diminution having occurred in the speed of the clutch-spindle. The friction-wheel R is hung in spring or loose bearings in the head of the frame, so that the lever F, grasping its shaft, depresses it to come in contact with roller y. The belt from the shafting above may be slack when it is not tightened by the depression of lever F, or it may run continuously, as a small fraction of an inch is all of the movement it requires to bring it in contact with roller y. The die-spindle when not held by the clutch rotates freely in the turret.

Now, having described my invention, what I claim is—

1. In combination with revolving chuck A having jaws o o, the inner and outer sleeves C W, the former, by intermittent reciprocating motion produced by cam H, feeding the stock a suitable length through chuck A; the latter by a similar motion produced by cam L alternately opening jaws o o, to permit the passage of stock, and closing them to hold stock to be operated upon by suitable tools.

2. In combination with clutch f and die m upon reciprocating turret X, the spindle Q, prolonged to hold the friction-roller y, for the purpose of enabling the die to be run off the screw in the direction of its revolution, substantially as shown and described.

3. The combination, with cam H, connection b, and sleeve C, and clutch mechanism H L h W, the clutch-bearing turret X and friction-roller R, substantially as shown and described.

4. In combination with cam H, connection b, and sleeve C, and clutch mechanism H L h W, the cutter V, operated as described.

5. In combination with the clutch-bearing turret X and friction-roller R, the cutter V, operated as described.

6. The combination with the cam H, connection b, and sleeve C, and clutch mechanism H L h W, with the clutch-bearing turret X and friction-roller R, the cutter V, operated as shown and described.

CHRISTOPHER M. SPENCER.

Witnesses:
R. F. HYDE,
HENRY MORRIS.